(12) United States Patent
Komatsu et al.

(10) Patent No.: US 6,796,629 B2
(45) Date of Patent: Sep. 28, 2004

(54) COLOR IMAGE PROCESSING APPARATUS, COLOR IMAGE FORMING METHOD, AND RECORDING MEDIUM

(75) Inventors: Manabu Komatsu, Tokyo (JP); Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/448,475

(22) Filed: May 29, 2003

(65) Prior Publication Data

US 2004/0004644 A1 Jan. 8, 2004

(30) Foreign Application Priority Data

Jun. 6, 2002 (JP) ........................................ 2002-165204

(51) Int. Cl.[7] .............................. B41J 2/205; B41J 2/21
(52) U.S. Cl. ......................................... 347/15; 347/43
(58) Field of Search ............................ 347/15, 43, 19; 358/1.1, 1.9

(56) References Cited

U.S. PATENT DOCUMENTS

| | | | |
|---|---|---|---|
| 5,299,025 A | 3/1994 | Shirasawa | |
| 5,519,515 A | 5/1996 | Komatsu | |
| 5,576,845 A | 11/1996 | Komatsu | |
| 5,610,732 A | 3/1997 | Komatsu | |
| 5,678,135 A | 10/1997 | Fukui et al. | |
| 5,689,590 A | 11/1997 | Shirasawa et al. | |
| 5,696,842 A | 12/1997 | Shirasawa et al. | |
| 5,831,751 A | 11/1998 | Ohneda et al. | |
| 6,005,970 A | 12/1999 | Ohneda et al. | |
| 6,016,359 A | 1/2000 | Komatsu | |
| 6,057,932 A | * 5/2000 | Yoshida et al. | ............... 358/1.9 |
| 6,137,595 A | 10/2000 | Sakuyama et al. | |
| 6,226,011 B1 | 5/2001 | Sakuyama et al. | |

FOREIGN PATENT DOCUMENTS

| | | |
|---|---|---|
| JP | 61290060 | 12/1986 |
| JP | 10086413 | 4/1998 |

OTHER PUBLICATIONS

U.S. patent application Ser. No. 09/771,999, filed Jan. 30, 2001.
U.S. patent application Ser. No. 09/873,993, filed Jun. 6, 2001.
U.S. patent application Ser. No. 10/067,417, filed Feb. 7, 2002.

* cited by examiner

Primary Examiner—Thinh Nguyen
(74) Attorney, Agent, or Firm—Cooper & Dunham LLP

(57) ABSTRACT

A color image processing apparatus realizes color reproduction in a color image output apparatus by controlling the total amount of coloring material used while making full use of the color reproduction range of the color image output apparatus. To this end, a signal C'M'Y'K', obtained after a γ conversion (gamma conversion), is converted into an amount of ink drops V (CMYK) at a conversion unit. Then, at a total ink drop quantity control unit, a total ink quantity of the amount of ink drops converted at the conversion unit and a limit value (maximum total ink drop quantity) stored in a maximum total ink quantity memory unit are compared, and the total ink quantity is controlled to be lower than the limit value. Then, the controlled amount of ink drops is converted into a recording control signal C"M"Y"K" at a control signal conversion unit.

11 Claims, 10 Drawing Sheets

FIG.8

| RECORDING CONTROL SIGNAL | C INK DROP AMOUNT (pl) | M INK DROP AMOUNT (pl) | Y INK DROP AMOUNT (pl) | K INK DROP AMOUNT (pl) |
|---|---|---|---|---|
| 0 | 0 | 0 | 0 | 0 |
| 1 | 5 | 5 | 6 | 4 |
| 2 | 10 | 10 | 12 | 8 |
| 3 | 15 | 15 | 18 | 12 |
| . | . | . | . | . |
| 127 | 1000 | 1000 | 1100 | 900 |
| 128 | 1020 | 1020 | 1120 | 920 |
| 129 | 1040 | 1040 | 1140 | 940 |
| . | . | . | . | . |
| 253 | 6920 | 6920 | 6920 | 6920 |
| 254 | 6960 | 6960 | 6960 | 6960 |
| 255 | 7000 | 7000 | 7000 | 7000 |

COLOR IMAGE PROCESSING APPARATUS, COLOR IMAGE FORMING METHOD, AND RECORDING MEDIUM

BACKGROUND OF THE INVENTION

1. Field of the Invention

The present invention relates to a color image processing apparatus and a color image forming method for forming a color image on a recording medium. The present invention is suitable for use in a color image output apparatus that forms an image by obtaining image data input from outside such as a color facsimile, a color printer, a color copier, etc., or a color printer software that operates inside a computer.

2. Description of the Related Art

In recording a full-color image with a color ink-jet printer, inks in three different colors, cyan C, magenta M, and yellow Y, or otherwise four colors, with the addition of black Bk to the above colors, are used to reproduce the colors of the original image. When the amount of discharged ink for each color approaches its maximum level, the amount of ink applied per unit area may be extremely large and the recording medium such as paper may not be able to soak up all the ink. Thus, the ink may spread out to other portions of the paper, or wrinkles may be created on the paper, thus significantly degrading the recording image quality.

In response to the above problem, various methods for controlling the total amount of ink and toner particles in a color ink-jet printer or a color laser printer have been proposed.

For example, in Japanese Patent Laid-Open Publication No.61-290060, an imaging method for recording an image is disclosed, wherein the total amount of recording material used in the recording is reduced when the total amount of a plurality of colors obtained for each pixel exceeds a predetermined value, while the input image data is processed so that the ratio of the cyan component to the magenta component to the yellow component will not be altered in the reproduced image. Also, in Japanese Patent Laid-Open Publication No.10-86413, a total ink quantity controlling method is disclosed, wherein multi-level image data are converted into bi-level data by reducing the multi-level data according to the size of the multi-level data of each color in the halftone image data.

As an example of an image output apparatus, an ink-jet printer represents an image tone (gray level) through a pseudo-halftone process using a plurality of dots of different sizes generated by changing the amount of discharged ink droplets according to an applied voltage and dither matrixes. FIG. 1A shows the relationship between the input gray level and dot size. FIGS. 1B, 1C, and 1D show the dither matrixes for the small dots, medium dots, and large dots, respectively. By way of example, when the input gray level is in the small dot range, the dither matrix of FIG. 1B for the small dots may be used to output small dots on the pixel positions corresponding to threshold values 2, 18, 6, 10, 14, 8, 24, 4, 20, 16, and 12 to reproduce the input gray level.

FIG. 2 shows the relationship between the recording control information and the actual amount of ink drops used in the above ink-jet printer. As is shown in FIG. 2, this relationship is nonlinear.

Basically, the above-described technology for controlling the total amount of coloring material has been developed for a case in which the relationship between the recording control information and the amount of ink drops is linear. Therefore, it is quite difficult to apply this technology to an ink-jet printer in which the relationship between the recording information and the ink drop level is nonlinear.

When a total amount of coloring materials is controlled using recording control information such as the CMYK multi-level data, the amount of ink applied per unit area will be different depending on the combination of the coloring materials; that is, the amount of ink varies depending on whether the relevant color is a primary color, a secondary color, or a tertiary color. For example, in a printer that establishes a relationship between the recording control information and the actual amount of ink drops used to be identical to that shown in FIG. 2, when the total amount of coloring materials is controlled so that the printer is prevented from recording with a total value of the recording control information for each color exceeding 150% of the maximum value for one single color, secondary colors such as blue (cyan: 255, magenta: 255) are recorded at approximately 7000 pl whereas tertiary colors (cyan: 255, magenta: 255, yellow: 255) are restricted to being recorded at around a total of 3000 pl. In such case, sufficient concentration cannot be obtained.

Further, when the relationship between the recording control information and the amount of ink drops is nonlinear, the ratio of colors will be altered even in reproducing secondary colors, that is, the suitable ink quantity can differ greatly even with just a difference in the hue. Thus, as a result of controlling the total amount of coloring materials, the color reproducing range that the printer is originally capable of recording may end up being minimized.

SUMMARY OF THE INVENTION

The present invention has been developed in response to the above mentioned problems of the related art and its general object is to make full use of the capabilities of a color image output apparatus upon reproducing the colors of the image.

Specifically, it is an object of the present invention to provide a color image processing apparatus that is capable of realizing color reproduction in a color image output apparatus having various features by controlling the total amount of coloring materials while making full use of the color reproducing range of the color image output apparatus.

Accordingly, a color image processing apparatus of the present invention for processing recording control information to reproduce a color image includes:

a converter that is adapted to convert the recording control information for each of color components into an amount of coloring material that is to be used after a halftone process; and a total quantity control unit that is adapted to control the amount of coloring material of each color component based on a total amount of coloring materials of all the color components and a prescribed limit value.

Further, the recording control information may be arranged for an ink-jet printer, and the color image processing apparatus may include:

a first converter that is adapted to convert the recording control information for each of color components into an amount of ink drops that is to be used after a halftone process;

a total quantity control unit that is adapted to control the amount of ink drops of each color component based on a total amount of ink drops of all the color components and a prescribed ink drop limit value corresponding to an image forming condition; and a second converter that is adapted to convert the controlled amount of ink drops into recording control information.

In this arrangement, the object of the present invention can be realized even in a case where the image forming condition is altered.

Additionally, the first converter and the second converter may perform a conversion by referring to a pre-established table providing a relationship between the recording control information and the amount of ink drops. This arrangement enables the object of the invention to be realized even when the relationship between the recording control information and the amount of ink drops in the image output apparatus is nonlinear.

Also, an image forming condition may include at least one of the material of a recording medium, the printing method, the resolution, the halftone processing method, or the color reproducing method. Thus, the object of the invention may be realized even when the image forming condition changes depending on for what purpose the color image device is used.

Further, the coloring materials may include a black coloring material, and the total quantity control unit is preferably adapted to control the amount of each coloring material other than the black coloring material. This arrangement prevents the degradation of black text contained in the image.

Additionally, the coloring materials may include cyan, magenta, and yellow, and the total quantity control unit is preferably adapted to control the amount of ink drops of each color component without changing the original ratio of the amount of coloring materials of cyan, magenta, and yellow. In this way, the object of the invention can be realized and the desired color can be reproduced.

It is another object of the present invention to provide a color image forming method that realizes color reproduction in a color image output apparatus having a variety of features by controlling the total amount of coloring material while making full use of the color reproducing range.

Such a color image forming method for reproducing a color image on a recording medium may include:

converting recording control information of each color component into an amount of coloring material that is to be used after a halftone process;

calculating a total amount of coloring material of all the color components; and reducing the amount of coloring material of each color component when the total amount of coloring material exceeds a predetermined value.

It is a further object of the present invention to provide a storage medium storing a color image processing program that enables color reproduction in a color image output apparatus having a variety of features by controlling the total amount of coloring material while making full use of the color reproducing range.

Such a storage medium is adapted to store a program for processing recording control information to reproduce a color image in a color image output apparatus, the program containing instructions for a computer to perform procedures of:

converting recording control information of each color component into an amount of coloring material that is to be used after a halftone process;

calculating a total amount of coloring material of all the color components; and reducing the amount of coloring material of each color component when the total amount of coloring material exceeds a predetermined value.

BRIEF DESCRIPTION OF THE DRAWINGS

FIG. 8 shows a one-dimensional conversion table for converting a recording control signal into an amount of ink drops;

DESCRIPTION OF THE PREFERRED EMBODIMENTS

In the following, preferred embodiments of the present invention are described with reference to the accompanying drawings.

Configuration of Image Processing System

Figure 3:
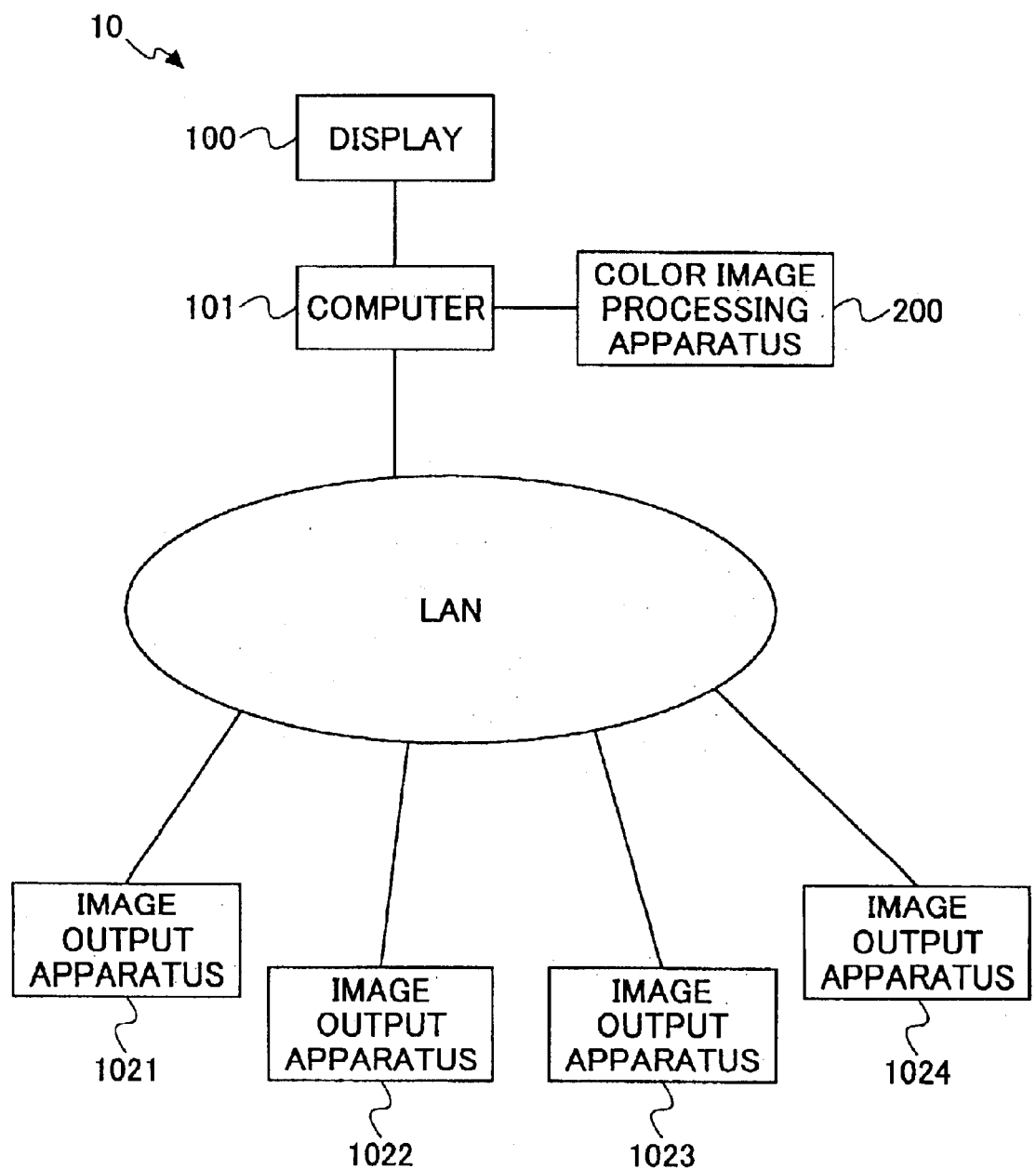
FIG. 3 shows an exemplary configuration of an image processing system.

FIG. 3 shows an image processing system 10 according to an embodiment of the present invention. This image processing system 10 includes a display 100, a computer 101, image output apparatuses 1021–1024, and a color image processing apparatus 200.

Herein, software such as various applications and printer drivers may be implemented in the computer 101. The display 100 is an output apparatus for displaying image data, and the image output apparatuses 1021–1024 are output apparatuses for printing out the image data. The image output apparatuses 1021–1024 may include color printers or other suitable types of output apparatuses having printer functions, for example, color copiers. Also, the number of the image output apparatuses used in the system 10 is not limited to four as in the illustrated example, rather, any number of image output apparatuses can be incorporated into the image processing system 10.

Figure 4:
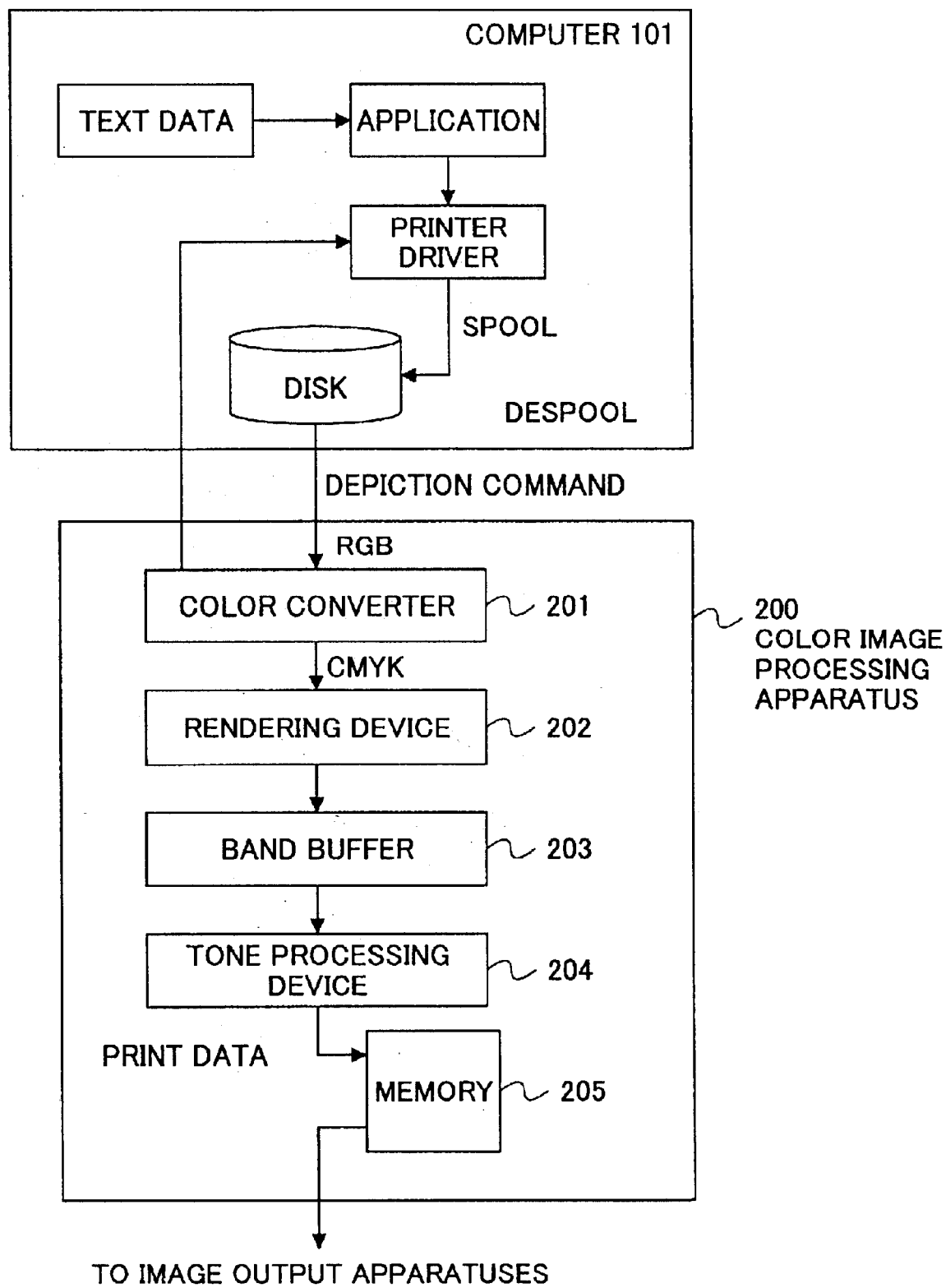
FIG. 4 illustrates the processing functions of a computer and an image processing apparatus.

FIG. 4 is a diagram illustrating the processing functions of the computer 101 and the color image processing apparatus 200 in the image processing system 10 of FIG. 3. The computer 101 sends a depiction command to the color image processing apparatus 200 via software such as an application and a printer driver.

The color image processing apparatus 200 includes a color converter 201, a rendering device 202, a band buffer 203, a tone processing device 204, and a page memory (memory device) 205. The color image processing apparatus 200 converts the depiction command sent from the computer 101 into data that can be processed by the image output apparatuses 1021–1024.

Operation of Image Processing System

In the following, an operation of the computer 101 in generating the depiction command will be described.

First, an operator displays image data on the display 100 and edits this data using an application, for example, implemented in the computer 101. When the editing process is completed, the image output apparatus (1021–1024) from which the image data will be output is selected, and a printing operation is instructed.

When the printing operation is instructed, the display 100 displays a print setup menu for setting printing conditions such as the material of the recording medium, the printing method, the resolution, the halftone processing method, the color reproducing method.

Upon receiving a command instructing the printing operation from the application, the computer 101 sends text data maintained in the application to the printer driver. The printer driver converts the text data into a depiction command that can be received by the color image processing apparatus 200, and then sends this command to the color image processing apparatus 200.

Next, an operation of the color image processing apparatus 200 according to the present embodiment will be described.

The color image processing apparatus 200 transmits/receives depiction commands to/from the computer 101 and also sends color data of the depiction command to the color converter 201. The color converter 201 converts the received color data in the RGB format into color data that is suitable for the image output apparatuses 1021–1024 (e.g. color data in the CMYK format), and then sends the converted data to the rendering device 202. The rendering device 202 converts the image data in command format to data in the Raster format and sends this data into the band buffer 203. Then, the tone processing device 204 reads the Raster image data from the band buffer 203, converts this data into tone data that can be processed by the image output apparatuses 1021–1024 through dithering, for example, and sends this tone data to the image output apparatuses 1021–1024. In this way, the image output apparatuses 1021–1024 are able to print out an image.

In the example of FIGS. 3 and 4, the rendering process, the color conversion process, and the tone process, are performed in the color image processing apparatus 200, independently from the computer 101 or the image output apparatuses 1021–1024. However, a portion of the above processing functions may be implemented in the computer 101 or the image output apparatuses 1021–1024. Alternatively, the above processing functions may be implemented in a printer control apparatus set independently from the image output apparatuses 1021–1024.

Also, the color image processing apparatus 200 of the present invention can be implemented as software. For example, the functions of the color image processing apparatus 200 can be realized in a printer driver, which is a software program implemented in a computer.

Configuration of Color Converter 201

Figure 5:
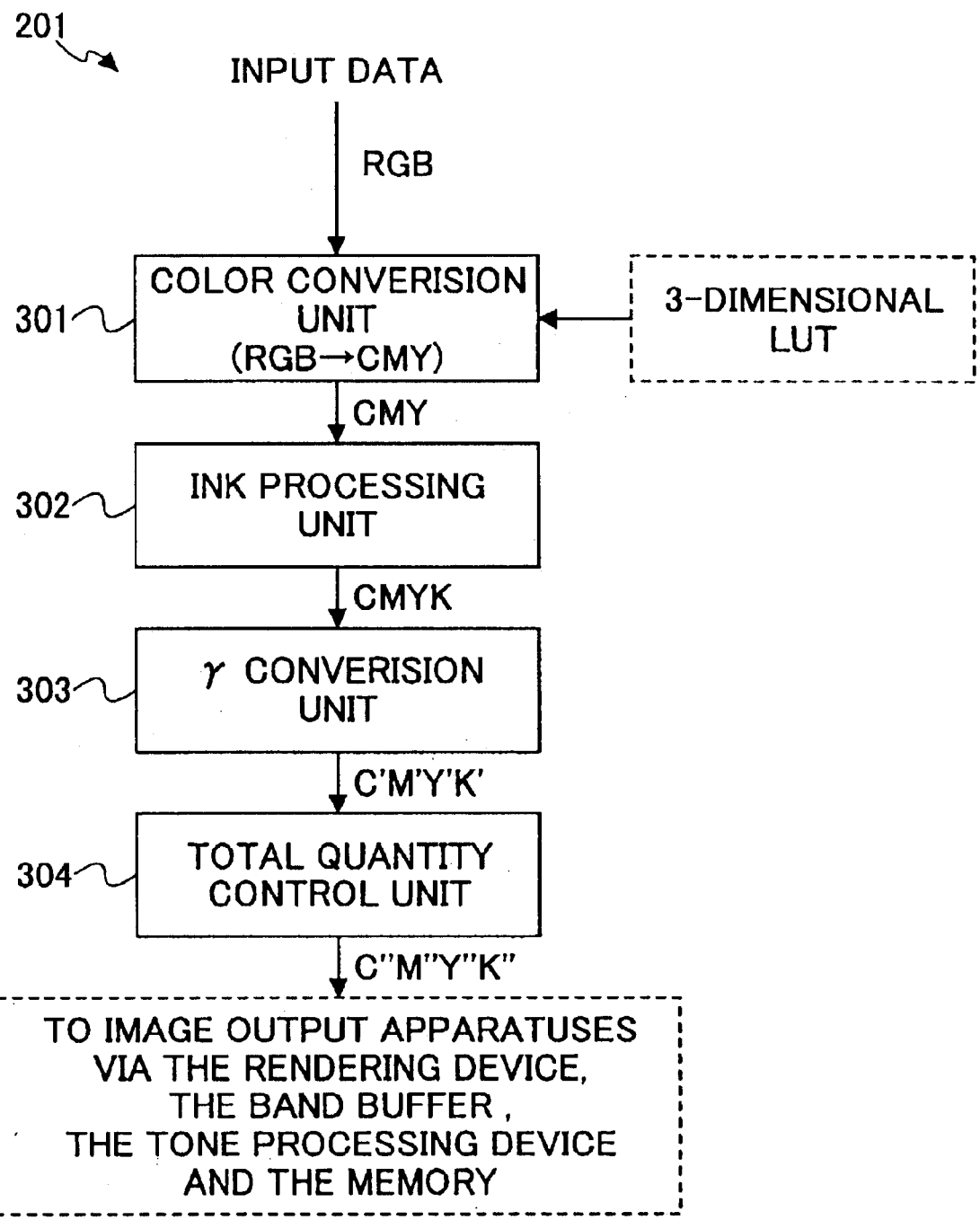
FIG. 5 shows a configuration of a color converter according to an embodiment of the present invention.

In the following, an exemplary embodiment of the color converter 201, including a characteristic feature of the present invention, will be described with reference to FIG. 5.

The color converter 201 receives input color signals such as RGB signals. The illustrated color converter 201 includes a color conversion unit 301 that converts these signals into CMY signals for the image output apparatuses 1021–1024, an ink processing unit 302 that converts the CMY signals into CMYK signals, which have K (black) components added according to a UCR (Under Color Removal) or UCA (Under Color Addition) rate, a γ conversion (gamma conversion) unit 303 that corrects the image forming engine characteristics, a total quantity control unit 304 that corrects the CMYK signals according to the maximum total quantity value of recording color material that the image output apparatuses 1021–1024 are capable of using in recording an image.

Next, the operation of the color converter 201 will be described.

First, RGB input signals, which correspond to the color data of the depiction command received from the printer driver, are sent to the color conversion unit 301. In the color conversion unit 301, the input RGB signals are converted into output CMY signals by referring to a pre-established three-dimensional look-up table (not shown), for example. That is, an output CMY signal value corresponding to a representative RGB value in the RGB space is pre-calculated and stored in the three-dimensional look-up table, and the color conversion unit 301 reads a plurality of output values from the three-dimensional look-up table to perform an interpolation computation.

Figure 6:
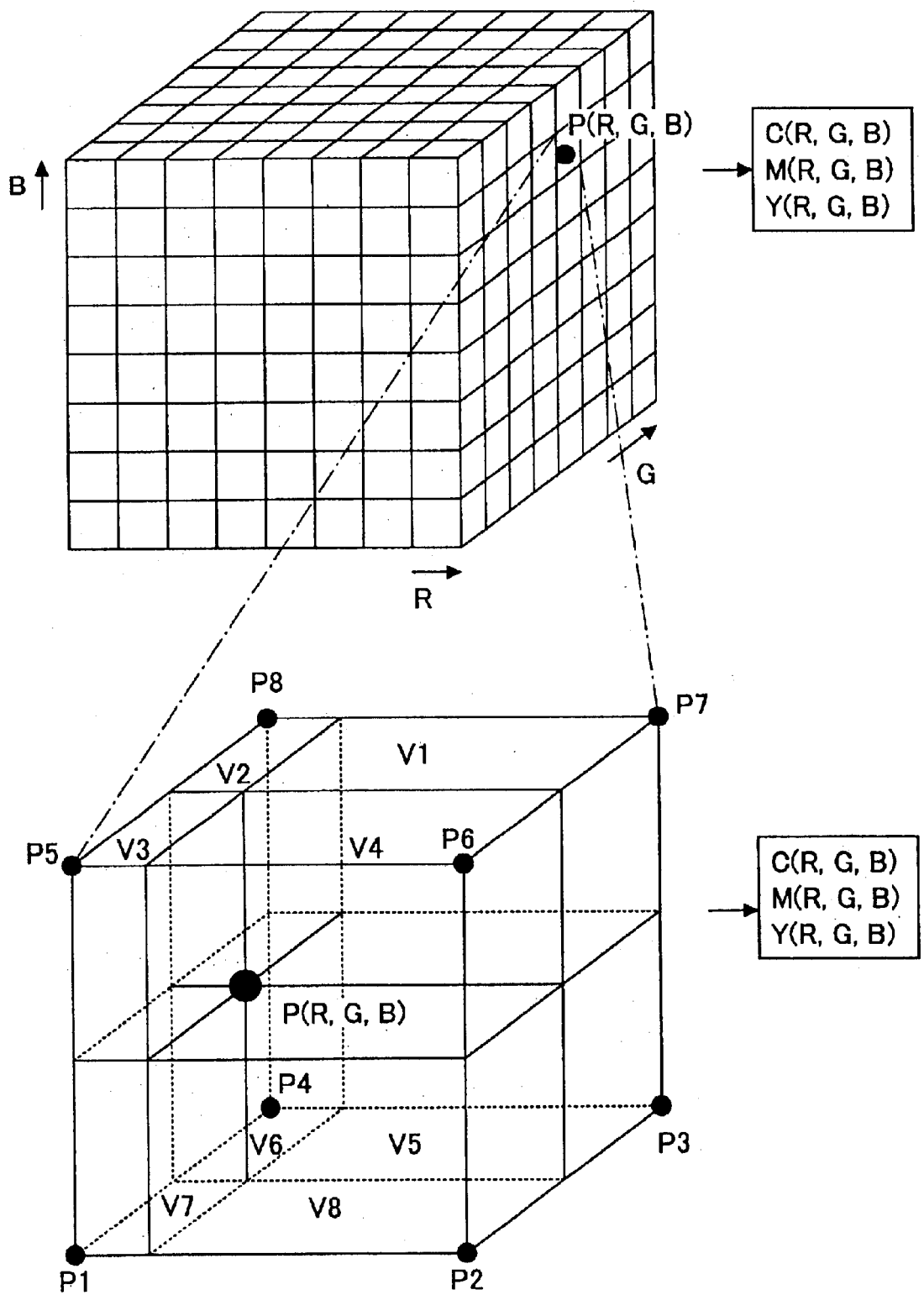
FIG. 6 illustrates a color conversion process performed in a color conversion unit.

In other words, the RGB (Red, Green, Blue) three-dimensional color space tone data are converted into output color components (C (Cyan), M (Magenta), and Y (Yellow)) data through memory map interpolation. FIG. 6 illustrates the memory map interpolation. Given that the RGB space corresponds to the input space, the RGB space is broken down into identical three-dimensional figures (the space is divided into cubes in this example). In order to obtain an output value P corresponding to the input coordinates (R, G, B), the cube that contains the above input coordinates is selected, and line interpolation is performed based on the weighted average of the volumes V1–V8 of the eight rectangular solid figures obtained from subdividing the selected cube at point P with respect to the output values of eight pre-selected corner points of the selected cube and the position of the input point within the cube (the distance from each of the points to the input point).

The ink processing unit 302 performs a process of replacing the common portions of the CMY components with K (black) components based on the UCR or UCA rate. For example, the CMY signal is converted into a CMYK signal using formulae (1) shown below:

$$K'=\alpha \times (\min(C, M, Y)-Th)$$
$$C'=C-\beta \times (\min(C, M, Y)-Th)$$
$$M'=M-\beta \times (\min(C, M, Y)-Th)$$
$$Y'=Y-\beta \times (\min(C, M, Y)-Th) \quad (1)$$

According to this formula, when $\alpha=\beta=1$, and Th=0, the UCR rate will be 100%. Herein, min (C, M, Y) denotes the minimum value of CMY, $\alpha$ and $\beta$ are constants, and Th denotes the ink-in starting point.

The ink-processed CMYK signal goes through a γ conversion at the γ conversion unit 303. Then, at the total quantity control unit 304, the signal is corrected according to the maximum total quantity value of the recording coloring materials with which the image output apparatuses 1021–1024 are capable of recording, and sends the corrected signal as a recording control signal to the image output apparatuses 1021–1024 via the rendering device 202, the band buffer 203, the tone processing device 204, and the memory device 205.

Figure 7:
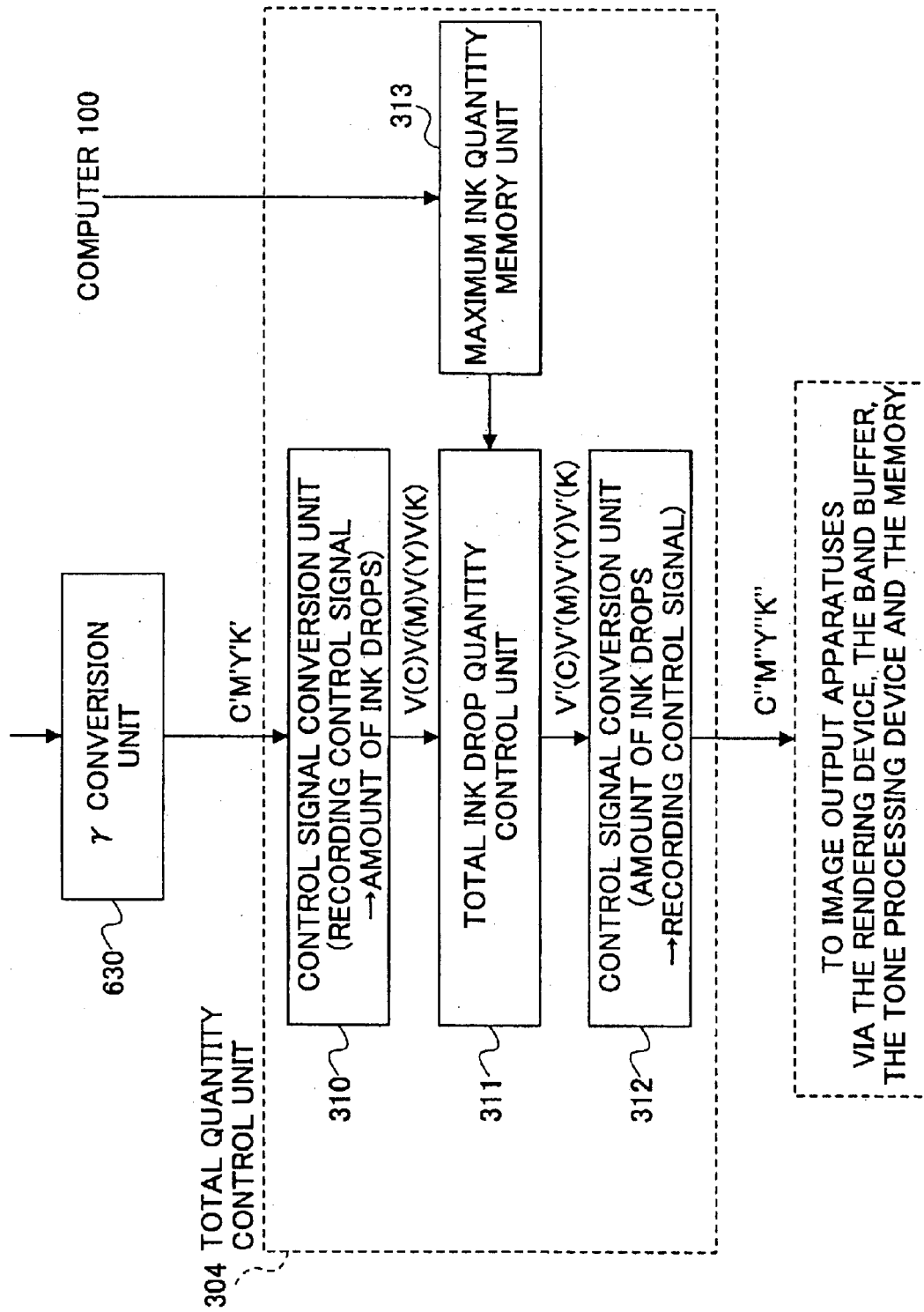
FIG. 7 shows a configuration of a total quantity control unit according to an embodiment of the present invention.

In the following, the total quantity control unit 304 will be described in further detail with reference to FIG. 7.

Figure 1:
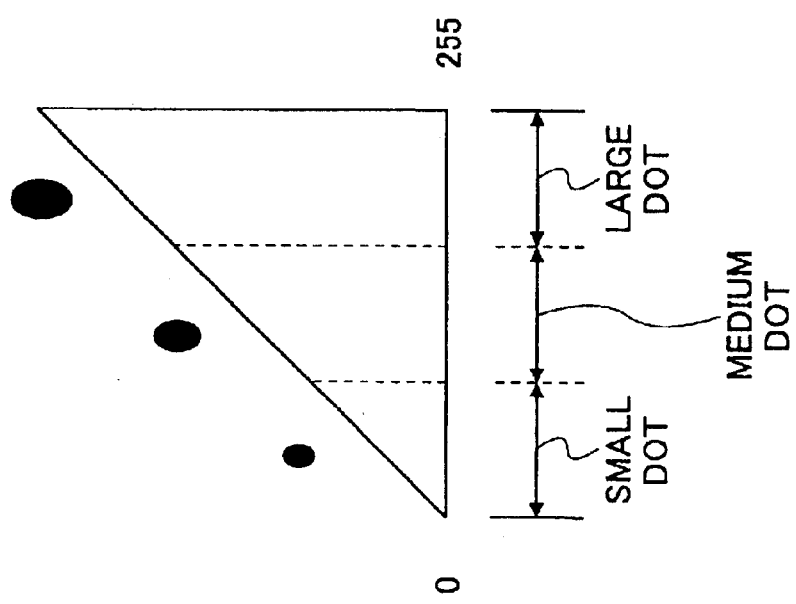
FIG. 1A shows a relationship between input grey level and dot size.
FIGS. 1B–1D show dither matrixes for each of the dot sizes.
Figure 2:
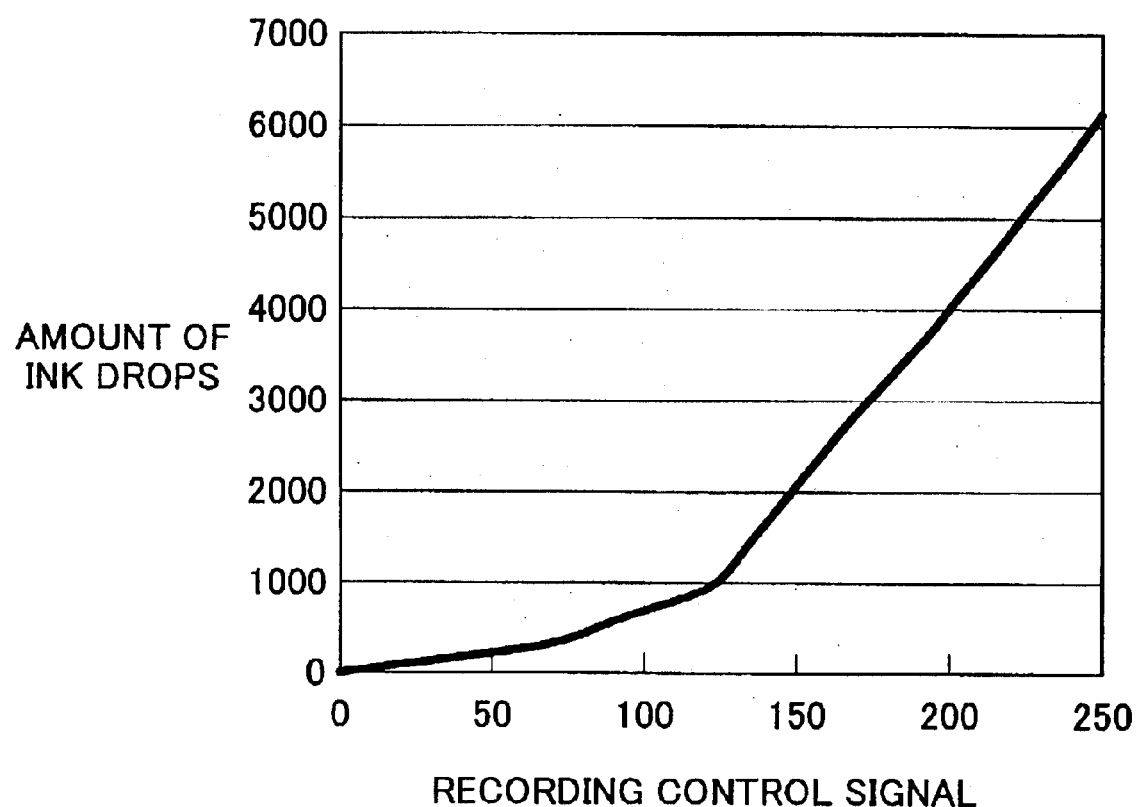
FIG. 2 shows a relationship between a recording control signal and an amount of ink drops.

The total quantity control unit 304 includes a control signal conversion (recording control signal→amount of ink drops) unit 310, total ink drop quantity control unit 311, a control signal conversion (amount of ink drops→recording control signal) unit 312, and a maximum ink quantity memory unit 313. The control signal conversion (recording control signal→amount of ink drops) unit 310 performs a halftone process for each color component and converts the CMYK signal, which CMYK signal has been γ-converted at the γ conversion unit 303, into an amount of ink drops (VcVmVyVk) to be used in the imaging. In this conversion process, a one-dimensional table, shown in FIG. 8, is used for providing the relationship between the recording control signal (CMYK) and the amount of ink drops (V). This relationship between the recording control signal and the ink drop quantity is nonlinear, as in FIG. 2.

The data converted into an amount of ink drops for each color (VcVmVyVk) at the control signal conversion (recording control signal→amount of ink drops) unit 310 is controlled at the ink drop total quantity control unit 311. For example, the total ink quantity is controlled so that it does not exceed a limit value (maximum total ink drop quantity, 'Max_Ink') using formulae (2) shown below:

When $(Vc+Vm+Vy+Vk)>$Max_Ink, $V'c = t \times Vc$ $V'm = t \times Vm$ $V'y = t \times Vy$ $V'k = Vk$ $$t = (\text{Max\_Ink} - Vk)/(Vc+Vm+Vy) \qquad (2)$$

Herein, the maximum total ink drop quantity is determined through experimentation.

The limit value of the total ink quantity (maximum total ink drop quantity) is determined by the maximum ink quantity memory unit 313 according to printing (image forming) conditions such as the material of the recording medium, the printing method, the resolution, the halftone processing method, color reproducing method, set by the operator upon instructing a printing operation.

Ink data (V'cV'mV'yV'k) obtained from controlling the amount of ink drops (VcVmVyVk) at the total ink drop quantity control unit 311 are re-converted into a recording control signal (C"M"Y"K") at the control signal conversion (amount of ink drops→recording control signal) unit 312. It is noted that the amount of ink drops (VcVmVyVk) is not controlled when the total ink drop quantity value does not exceed the maximum total ink drop quantity (Max_Ink). The recording control signal is then sent to the image output apparatuses 1021–1024 via the rendering device 202, the band buffer 203, the tone processing device 204, and the memory device 205. In converting the amount of ink drops into a recording control signal, the one-dimensional table of FIG. 8 providing the relationship between the recording control signal (CMYK) and the ink drop quantity information may be used, and a reverse conversion with respect to the conversion performed by the control signal conversion (recording control signal→amount of ink drops) unit 310 may be performed. However, the conversion of the amount of ink drops into the recording control signal (CMYK) is not limited to the illustrated table conversion.

Figure 9:
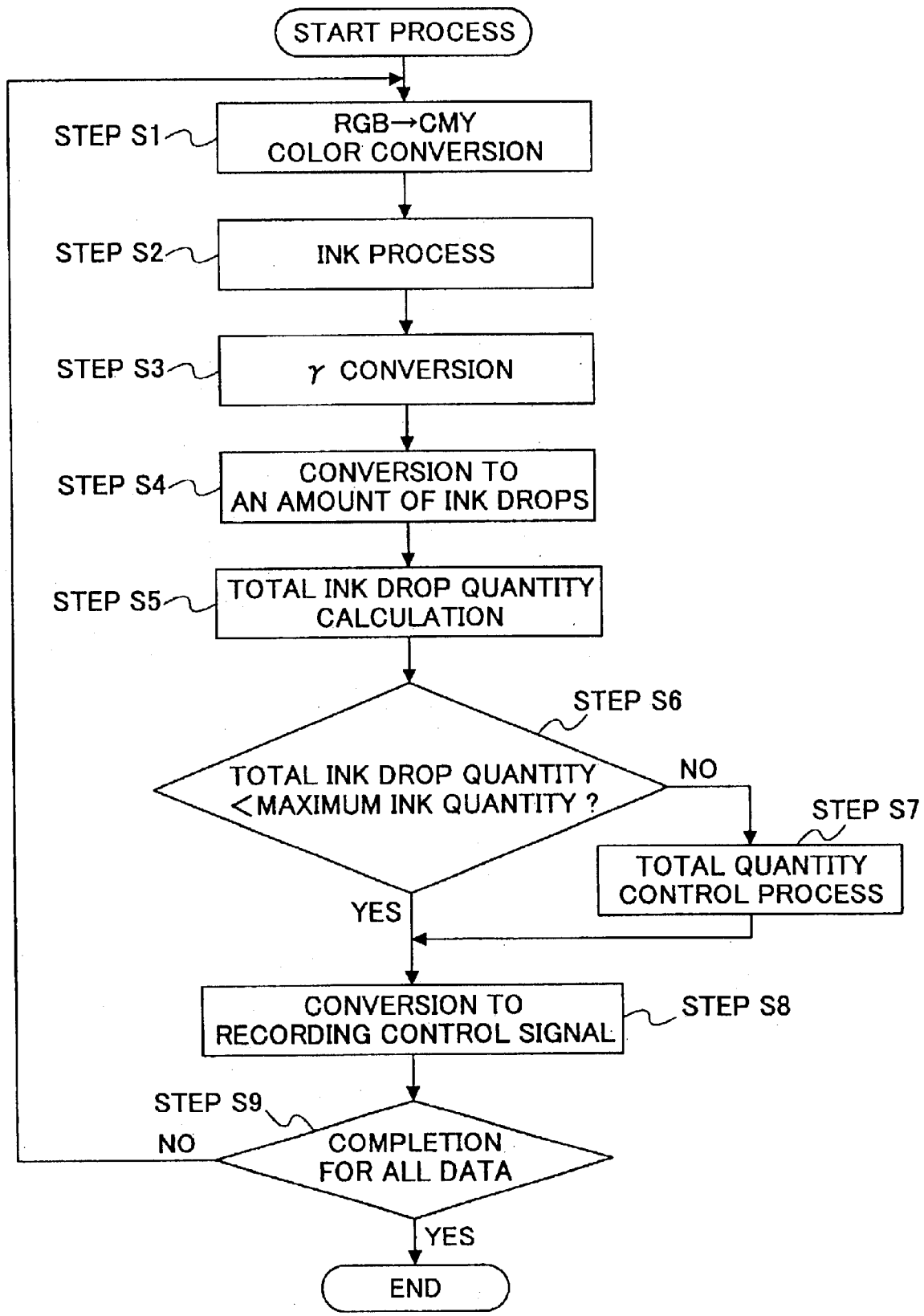
FIG. 9 is a flowchart illustrating an image processing method according to an embodiment of the present invention.

FIG. 9 is a flowchart illustrating a color conversion method including the above-described process of converting the recording control information.

First of all, in step S1, an input RGB signal is converted into a CMY signal by interpolation using the three-dimensional look-up table (not shown).

In step S2, the ink process in which the common portions of the CMY components are replaced with K (black) components is performed according to the formulae (1) so that the CMY signal is converted into a CMYK signal.

In step S3, γ conversion is performed to convert the CMYK signal into a printer control signal, and in step S4, the printer control signal is converted into an amount of ink drops necessary for each color component.

In step S5, the total ink drop quantity for all the color components is calculated. In step S6, the total ink drop quantity is compared with the maximum total ink quantity allowed for a particular image forming condition, and when the total ink drop quantity is greater than the maximum total ink quantity, the total ink drop quantity is controlled according to the formulae (2) in step S7. In the total ink quantity control, the CMY ink drop quantity is reduced without changing the original CMY color ratio.

In step S8, the amount of ink drop quantity for each color is re-converted into a recording control signal (CMYK), and in step S9, it is confirmed that all the above processes have been performed for all of the image data and the color conversion process is completed.

According to another embodiment of the present invention, a storage medium that records software program codes that realize the above described image processing functions may be provided in a system or an apparatus, and the computer (alternatively a CPU, or an MPU) of the system or apparatus may be arranged to read and execute the program codes stored in the storage medium.

Figure 10:
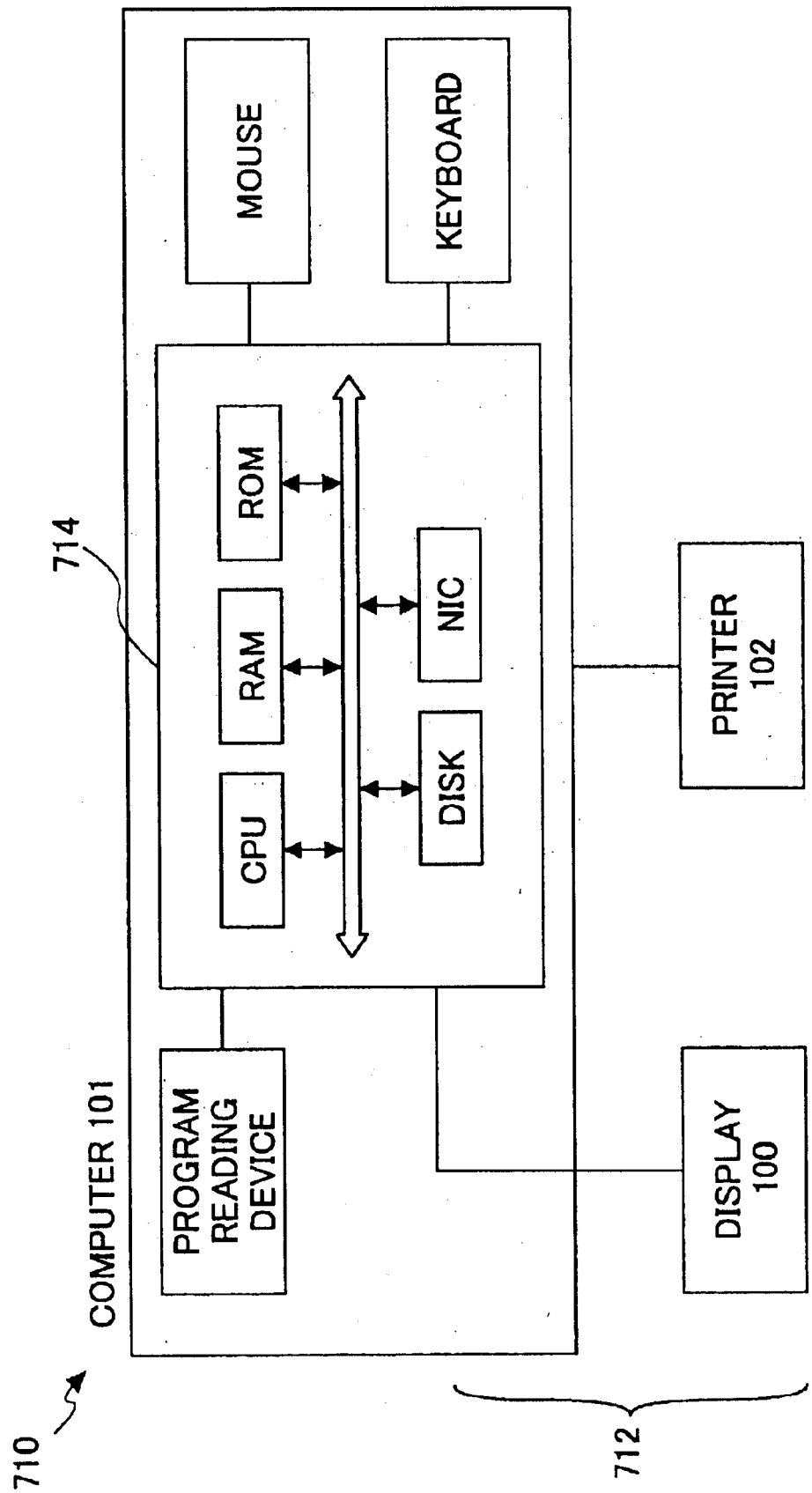
FIG. 10 shows a configuration of the computer according to an embodiment of the present invention in which image processing functions are realized using a program.

FIG. 10 shows an exemplary configuration of an image processing system 710 that is capable of executing the image processing programs that realize the functions of the present invention. In this image processing system 710, a work station 712 and a printer 102 are connected. The work station 712 realizes the above described color conversion functions, and includes a display 100, a keyboard, a program reading device, and a computation processing device 714. The computation processing device 714 includes a CPU that is capable of executing various commands, and a ROM and a RAM are connected to the CPU via a bus. Also, a DISK, which is a large capacity storage device, and an NIC that performs communication with the apparatuses within the network are connected to the bus.

The program reading device is a device that reads the various program codes stored in a storage medium such as a floppy disk, a hard disk, an optical disk (i.e. CD-ROM, CD-R, CD-R/W, DVD-ROM, DVD-RAM, for example), a magneto-optical disk, or a memory card. This program reading device may be a floppy disk drive, an optical disk drive, or a magneto-optical disk drive, for example.

The program codes stored in the storage medium are read out by the program reading device and stored in the DISK. The program codes stored in the DISK are then executed by the CPU so that the above described image processing method, for example, can be realized. Also, in another embodiment, the computer 101 may read and execute the program codes, and an OS (operating system), a device driver, for example, may perform all or a portion of the actual processes based on the instructions of the program code.

Alternatively, the program codes read out from the storage medium may be written in a function extending card inserted in the computer or a memory that is implemented in a function extending unit connected to the computer 101, wherein the function extending card or a CPU implemented in the function extending unit performs all or a portion of the actual processes to realize the functions of the present invention.

Further, the present invention is not limited to the above described preferred embodiments, and variations and modifications may be made without departing from the scope of the present invention.

The present application is based on and claims the benefit of the earlier filing date of Japanese priority application No.2002-165204 filed on Jun. 6, 2002, the entire contents of which are hereby incorporated by reference.

What is claimed is:

1. A color image processing apparatus for processing recording control information to reproduce a color image, comprising:
   a converter that is adapted to convert the recording control information for each of color components into an amount of coloring material that is to be used after a halftone process, the conversion being based on a nonlinear relation between the recording control information and the amount of coloring material; and
   a total quantity control unit that is adapted to control the amount of coloring material of each color component based on a total amount of coloring materials of all the color components and a prescribed limit value.

2. The color image processing apparatus as claimed in claim 1, wherein:
   the coloring materials include a black coloring material, and the total quantity control unit is adapted to control the amount of each of the coloring materials other, than the black coloring material.

3. The color image processing apparatus as claimed in claim 2, wherein:
   the coloring materials include cyan, magenta and yellow, and the total quantity control unit is adapted to control the amount of each of the coloring materials without changing the original ratio of the amounts of coloring materials of cyan, magenta, and yellow.

4. A color image processing apparatus for processing recording control information to reproduce a color image in an ink-jet printer, comprising:
   a first converter that is adapted to convert the recording control information for each of color components into an amount of ink drops that is to be used after a halftone process, the conversion being based on a nonlinear relation between the recording control information and the amount of ink drops;
   a total quantity control unit that is adapted to control the amount of ink drops of each color component based on a total amount of ink drops of all the color components and a prescribed ink drop limit value corresponding to an image forming condition; and
   a second converter that is adapted to convert the controlled amount of ink drops into recording control information based on the nonlinear relation.

5. The color image processing apparatus as claimed in claim 4, wherein:
   the first converter and the second converter realize the conversion by referring to a pre-established table providing the relationship between the recording control information and the amount of ink drops.

6. The color image processing apparatus as claimed in claim 4, wherein:
   the image forming condition includes at least one of a material of a recording medium, a printing method, a resolution, a halftone processing method, and a color reproducing method.

7. The color image processing apparatus as claimed in claim 4, wherein:
   the ink drops include black ink drops, and the total quantity control unit is adapted to control the amount of the ink drops of each color component other than the black ink drops.

8. The color image processing apparatus as claimed in claim 4, wherein:
   the ink drops include cyan, magenta, and yellow, and the total quantity control unit is adapted to control the amount of each of the ink drops without changing the original ratio of the amounts of ink drops of cyan, magenta, and yellow.

9. A color image processing apparatus for processing recording control information to reproduce a color image, comprising:
   converting means for converting the recording control information for each of color components into an amount of coloring material that is to be used after a halftone process, the conversion being based on a nonlinear relation between the recording control information and the amount of coloring material; and
   total quantity controlling means for controlling the amount of coloring material of each color component based on a total amount of coloring materials of all the color components and a prescribed threshold level.

10. A color image forming method for reproducing a color image on a recording medium to record the color image, said method comprising the steps of:
    converting recording control information for each of color components into an amount of coloring material that is to be used after a halftone process, the conversion being based on a nonlinear relation between the recording control information and the amount of coloring material;
    calculating a total amount of coloring materials of all the color components; and
    reducing the amount of coloring material of each color component when the total amount of coloring material exceeds a predetermined value.

11. A computer-readable storage medium storing a program for processing recording control information to reproduce a color image, said program containing instructions for a computer to perform procedures of:
    converting recording control information for each of color components into an amount of coloring material that is to be used after a halftone process, the conversion being based on a nonlinear relation between the recording control information and the amount of coloring material;
    calculating a total amount of coloring material of all the color components; and
    reducing the amount of coloring material of each color component when the total amount of coloring material exceeds a predetermined value.

* * * * *